UNITED STATES PATENT OFFICE.

CARL JAGERSPACHER, OF BASEL, SWITZERLAND, ASSIGNOR TO SOCIETY OF CHEMICAL INDUSTRY IN BASLE, OF BASEL, SWITZERLAND.

AZODYESTUFFS DYEING ON MORDANTS.

1,382,196.     Specification of Letters Patent.     Patented June 21, 1921.

No Drawing.     Application filed May 14, 1919. Serial No. 297,095.

*To all whom it may concern:*

Be it known that I, CARL JAGERSPACHER, a citizen of the Swiss Republic, and resident of Basel, Switzerland, have invented new and useful Azodyestuffs Dyeing on Mordants, of which the following is a full, clear, and exact specification.

I have found that by combining aromatic orthoöxydiazocompounds with a monoalpha-oxynaphthalene monosulfo carboxylic acid, which combines with diazocompounds in the ortho position relatively to the hydroxyl group without splitting off the carboxyl group there are obtained new azodyestuffs dyeing on mordants which are particularly suitable for printing cotton with chromium mordants. These new azodyestuffs constitute, in a dry state, dark powders, which dissolve in water with red to violet colorations and in concentrated sulfuric acid also with red to violet colorations, dye wool in an acid bath red to brown and violet tints becoming, on subsequent chroming, red to violet, fast to fulling and to potting and produce red to violet prints fast to soaping, chlorin and light when printed on cotton with chromium mordants.

The manufacture of the new oxynaphthalenesulfocarboxylic acids which combines with diazocompounds in the ortho position relatively to the hydroxyl group, without splitting off the carboxyl group employed as parent materials and the manufacture of the new azodyestuffs derived from the said acids are illustrated by the following examples:

EXAMPLE 1.

*Prepartion of the 1-oxynaphthalene-3-sulfo-6-carboxylic acid.*

320 parts of naphthalene-5-7-disulfo-2-carboxylic acid (derived from the corresponding naphthylamindisulfonic acid by substituting the cyanogen group for the amino group and saponifying subsequently the cyanogen group) are heated with 500 parts of soda lye of 40% in an autoclave for 4 hours at 195° C., while stirring, and from the resulting liquid melted mass the 1-oxynaphthalene-3-sulfo-5-carboxylic acid is precipitated in form of a yellow precipitate by adding hydrochloric acid.

The acid sodium salt of the new acid is readily soluble in hot water and crystallizes therefrom in form of yellowish crystals. Its alkaline solution shows a feebly green-yellow fluorescence.

EXAMPLE 2.

*Prepartion of the 1-oxynaphthalene-3-sulfo-5-carboxylic acid.*

320 parts of naphthalene-5-7-disulfo-1-carboxylic acid (derived from the corresponding naphthylamindisulfonic acid by substituting a cyanogen group for the amino group and saponifying the cyanogen group subsequently) are heated with 200 parts of soda lye and 300 parts of water in an autoclave, for 3-4 hours at 190 to 195° C., whereby the pressure rises to 9-10 atmospheres. From the resulting melted mass acidified with hydrochloric acid, the 1-oxynaphthalene-3-sulfo-5-carboxylic acid precipitates in form of a yellow, crystalline pulp. It is more readily soluble in water than the isomeric 1-oxynaphthalene-3-sulfo-6-carboxylic acid and crystallizes therefrom in form of leaflets. Its alkaline solution shows a feebly green fluorescence.

EXAMPLE 3.

The diazo compound derived, in the known manner, from 19.8 parts of 4-nitro-2-amino-1-oxybenzene-6-carboxylic acid is introduced into a solution as concentrated as possible of 29 parts of 1-oxynaphthalene-3-sulfo-6-carboxylic acid, 40 parts of sodium carbonate and 26 parts of soda lye of 30%. After a stirring for about 12 hours the combination is accomplished. The precipitated crystalline dyestuff is filtered off, after cooling, pressed and dried.

It constitutes in a dry state a greenish-black powder, dissolving in water to a violet solution and in concentrated sulfuric acid to a blue-red solution. It dyes wool in an acid bath red tints turning on subsequent chroming to a bordeaux fast to fulling as to potting. When printed on cotton with chromium mordants, it gives a claret fast to soaping, chlorin and light.

If in the foregoing example an equivalent quantity of 4-sulfo-2-amino-1-oxybenzene-6-carboxylic acid is substituted for the 4-nitro-2-amino-1-oxybenzene-6-carboxylic acid, while the isomeric 1-oxynaphthalene-3-sulfo-5-carboxylic acid is substituted for the 1-oxynaphthalene-3-sulfo-6-carboxylic acid, there is obtained a dyestuff dissolving in water and in concentrated sulfuric acid to violet-red solutions and dyeing wool in an acid bath claret tints turning on subsequent chroming to a fast violet. When printed on cotton with chromium mordants, this dyestuff produces red-violet tints.

What I claim is:

1. As new products the herein described azodyestuffs dyeing on mordants, derived from aromatic orthoöxydiazocompounds and a monoalphaoxynaphthalenesulfocarboxylic acid, which combines with diazocompounds in the ortho position relatively to the hydroxyl group, without splitting off the carboxyl group, which constitute in a dry state dark powders dissolving in water and in concentrated sulfuric acid with red to violet colorations, dye wool in an acid bath red to brown tints becoming on subsequent chroming, red to violet fast to fulling and to potting and produce, when printed on cotton with chromium mordants, red to violet tints fast to soaping, chlorin and light.

2. As a new article of manufacture the herein described azodyestuff dyeing on mordants, derived from 4-nitro-2-diazo-1-oxybenzene-6-carboxylic acid and 1-oxynaphthalene-3-sulfo-6-carboxylic acid, which constitutes, in a dry state, a greenish-black powder, dissolving in water to a violet and in concentrated sulfuric acid to a blue-red solution, dyes wool in acid bath, red tints turning, on subsequent chroming, to a claret fast to fulling and to potting and gives, when printed on cotton with chromium mordants, claret tints fast to soaping, chlorin and light.

In witness whereof I have hereunto signed my name this 16th day of April, 1919, in the presence of two subscribing witnesses.

CARL JAGERSPACHER.

Witnesses:
AMAND RITTER,
SCOTT TAGGART.